US008588235B2

(12) United States Patent
Do et al.

(10) Patent No.: US 8,588,235 B2
(45) Date of Patent: Nov. 19, 2013

(54) METHOD OF PROVIDING MULTICAST/BROADCAST SERVICE USING WIBRO/WIMAX NETWORK AND SYSTEM USING THE METHOD

(75) Inventors: Mi-Sun Do, Suwon-si (KR); Seung Mok Shin, Seoul (KR); Taori Rakesh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1303 days.

(21) Appl. No.: 11/812,725

(22) Filed: Jun. 21, 2007

(65) Prior Publication Data

US 2008/0101376 A1 May 1, 2008

(30) Foreign Application Priority Data

Oct. 27, 2006 (KR) ........................ 10-2006-0104846

(51) Int. Cl.
 *H04L 12/28* (2006.01)
(52) U.S. Cl.
 USPC ..................................... 370/395.21; 370/329
(58) Field of Classification Search
 USPC ......... 370/329, 395.2, 395.21, 338, 328, 400, 370/401, 352, 229, 235, 236, 351, 392; 455/403, 422.1, 426.1, 558, 455/432.1–433, 435, 435.1, 445, 450, 455/452.1, 507, 514, 517; 709/201, 203, 709/217–219, 223, 225, 226, 238–242, 249
 See application file for complete search history.

(56) References Cited

U.S. PATENT DOCUMENTS 7,319,691 B2 * 1/2008 Qing et al. .................... 370/351
7,339,913 B2 * 3/2008 Chou et al. .................... 370/338
7,567,528 B2 * 7/2009 Naghian et al. ............... 370/328

* cited by examiner

*Primary Examiner* — Charles Appiah
*Assistant Examiner* — Alexander Yi
(74) *Attorney, Agent, or Firm* — NSIP Law (57) ABSTRACT

A system and method for providing a multicast/broadcast service (MBS) using a Wireless Broadband Internet/World Interoperability for Microwave Access (WiBro/WiMAX) network are provided, which include an MBS control unit for generating a beginning and an end of an MBS bearer session, a quality of service (QoS) control unit for requesting an allocation and release of a QoS, an access control router (ACR) for allocating a multicast service flow identifier (SFID) with respect to the MBS bearer session in order to provide an MBS user terminal with MBS bearer traffic which is received from an MBS content source, and for releasing the allocated multicast SFID when the release of the QoS is requested, and a radio access station (RAS) for allocating a multicast connection identifier (CID) corresponding to the allocated multicast SFID according to whether an MBS user requests the MBS bearer traffic, and controlling a radio resource with the MBS user terminal.

22 Claims, 8 Drawing Sheets

METHOD OF PROVIDING MULTICAST/BROADCAST SERVICE USING WIBRO/WIMAX NETWORK AND SYSTEM USING THE METHOD

CROSS-REFERENCE TO RELATED APPLICATION

This application claims the benefit under 35 U.S.C. §119(a) of Korean Patent Application No. 10-2006-0104846, filed Oct. 27, 2006, in the Korean Intellectual Property Office, the entire disclosure of which is incorporated herein by reference.

BACKGROUND OF THE INVENTION

1. Field of the Invention

The present invention relates to a multicast/broadcast service (MBS). More particularly, the present invention relates to a method of providing an MBS using a Wireless Broadband Internet/Worldwide Interoperability for Microwave Access (WiBro/WiMAX) network, and a system using the method which can provide a terminal which is connected to the WiBro/WiMAX network with the MBS.

2. Description of Related Art

A Wireless Broadband Internet/Worldwide Interoperability for Microwave Access (WiBro/WiMAX) network communicates in a unicast manner when providing voice and data services. When application services which require a quality of service (QoS), such as voice and video phone services, are requested in a mobile terminal, the request is received in an application layer. A policy function (PF), which controls a QoS with respect to access networks, is requested for the QoS. Also, the PF requests WiBro/WiMAX access networks for the QoS, and provides the QoS in a network layer.

However, when users select a particular IPTV channel in MBS services such as an Internet protocol television (IPTV) service, a mobile terminal transmits a message, including a multicast Internet protocol (IP) address corresponding to an IPTV channel, to WiBro/WiMAX access networks. In this instance, the message including the multicast IP address, may be an Internet group management protocol (IGMP) message in the case utilizing Internet Protocol version 4 (IPv4), and a multicast listener discovery (MLD) message in the case utilizing Internet Protocol version 6 (IPv6).

The WiBro/WiMAX access networks which receive the IGMP/MLD message selects and transmits an IP multicast stream, which is identical to a multicast IP address included in the IGMP/MLD message, to a terminal. In this case, although multiple IPTV users simultaneously select the same IPTV channel, a single IPTV stream is transmitted to a terminal in a multicast method.

In IPTV services, unlike voice and video phones in a unicast manner, a service request from a terminal is not received in the application layer. In IPTV services, the IGMP/MLD message is received in the WiBro/WiMAX access networks, and the multicast stream is transmitted to the terminal. Accordingly, a new QoS provisioning structure, which is different from a QoS provisioning structure which is applied to an application service in a unicast manner, is required.

In the IPTV services described above, a single IP multicast stream corresponding to an IPTV channel is transmitted to a plurality of mobile terminals in a multicast method. Accordingly, a method of providing a QoS with respect to the IP multicast stream corresponding to each IPTV channel is provided, as opposed to a method of providing a particular mobile terminal with the QoS.

Also, when performing an authorization for the IPTV services in the same method as a Multimedia broadcast/Multicast service (MBMS), the WiBro/WiMAX access networks are required to perform service authorizations with an IPTV control node every time mobile terminals receive the IGMP/MLD message which requests an IPTV channel change. Specifically, whenever the mobile terminals change channels, the service authorizations are required to be performed through an interoperation between the WiBro/WiMAX access networks and the IPTV control node. Accordingly, a channel change such as a change to an existing TV broadcast, may not be performed quickly.

Accordingly, a new IPTV service authorization system and method, which is different from a service authorization provided in the 3rd Generation Partnership Project (3GPP) MBMS, is required to provide a fast channel change of IPTV services in the WiBro/WiMAX access networks.

SUMMARY OF THE INVENTION

Exemplary embodiments of the present invention are provided to address at least the above problems and/or disadvantages, and to provide at least the advantages described below. Accordingly, an aspect of exemplary embodiments of the present invention is to provide a method of providing a multicast/broadcast service (MBS) using a Wireless Broadband Internet/Worldwide Interoperability for Microwave Access (WiBro/WiMAX) network and a system using the method, which provide a quality of service (QoS) with respect to the MBS via the WiBro/WiMAX network.

Exemplary embodiments of the present invention also provide a method of providing an MBS using a WiBro/WiMAX network and a system using the method, which can perform a user authentication in an access control router (ACR) and which can also provide a fast channel change.

According to an aspect of exemplary embodiments of the present invention, a system for providing a multicast/broadcast service (MBS) using a Wireless Broadband Internet/World Interoperability for Microwave Access (WiBro/WiMAX) network is provided, the system comprising an MBS control unit for generating a beginning and an end of an MBS bearer session, a quality of service (QoS) control unit for requesting an allocation and release of a QoS with respect to the beginning and the end of the MBS bearer session which is received from the MBS control unit, an access control router (ACR) for allocating a multicast service flow identifier (SFID) with respect to the MBS bearer session in order to provide an MBS user terminal with MBS bearer traffic which is received from an MBS content source when the allocation of the QoS is requested, and for releasing the allocated multicast SFID when the release of the QoS is requested, and a radio access station (RAS) for allocating a multicast connection identifier (CID) corresponding to the allocated multicast SFID according to whether an MBS user requests the MBS bearer traffic, and for controlling a radio resource with the MBS user terminal.

The system can further comprise a user authentication server for receiving an MBS user profile which is provided from the MBS control unit, and for transmitting the MBS user profile to the ACR.

The user authentication server can be configured to receive, from the ACR, information about a user that requests the MBS bearer traffic, and perform an authentication of the user based on the MBS user profile.

The ACR can be configured to perform an authentication of a user that requests the MBS bearer traffic, based on the MBS user profile which is received from the user authentication server, and provide the RAS with the allocated multicast SFID with respect to the MBS bearer traffic and the MBS bearer traffic, when the user is authenticated.

The ACR can comprise an MBS providing unit for performing the authentication of the user that requests the MBS bearer traffic, based on the MBS user profile which is received from the user authentication server, and for providing the RAS with the allocated multicast SFID with respect to the MBS bearer traffic when the user is authenticated.

The ACR can further comprise an MBS request unit for receiving the request for the MBS bearer traffic, providing the MBS providing unit with information about the user, requesting the MBS providing unit for the QoS with respect to the MBS bearer session, and transmitting the MBS bearer traffic to the MBS user terminal of the user.

The RAS can comprise an MBS request unit for providing the ACR with information of a user with respect to a request for the MBS bearer traffic, and transmitting the MBS bearer traffic to the MBS user terminal of the user when the user is authenticated based on the MBS user profile.

The RAS can further comprise a radio resource providing unit for allocating the multicast CID corresponding to the allocated multicast SFID with respect to the MBS bearer traffic, and reserving the radio resource by controlling an acceptance with respect to the requested MBS bearer traffic in order to provide the QoS when transmitting the requested MBS bearer traffic to the MBS user terminal of the user.

An authentication of the user based on the MBS user profile can be performed in the ACR or the user authentication server.

The MBS control unit can be configured to update the MBS user profile and provide the user authentication server with the updated MBS user profile when the MBS user is registered.

The multicast SFID can comprise a unique value to classify the MBS bearer session in an identical MBS zone.

The MBS can be configured to correspond to an Internet protocol television (IPTV) service.

According to an aspect of exemplary embodiments of the present invention, a method of providing an MBS using a WiBro/WiMAX network can be provided, the method comprising generating a beginning and an end of an MBS bearer session in an MBS control unit, requesting an allocation and release of a QoS with respect to the beginning and the end of the MBS bearer session which is received from the MBS control unit, in a QoS control unit, allocating a multicast SFID with respect to the MBS bearer session in order to provide an MBS user terminal with MBS bearer traffic which is received from an MBS content source, when the allocation of the QoS is requested, and releasing the allocated multicast SFID when the release of the QoS is requested, in an ACR, and allocating a multicast CID corresponding to the allocated multicast SFID according to whether an MBS user requests the MBS bearer traffic, and controlling a radio resource with the MBS user terminal, in an RAS.

Other aspects, advantages, and salient features of the present invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following detailed description, taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description, such as detailed constructions and elements, are provided to assist in a comprehensive understanding of embodiments of the present invention and are merely exemplary. Accordingly, those of ordinary skill in the art will recognize that various changes and modifications of the exemplary embodiments described herein can be made without departing from the scope and spirit of the present invention. Also, descriptions of well-known functions and constructions are omitted for clarity and conciseness.

Figure 1:
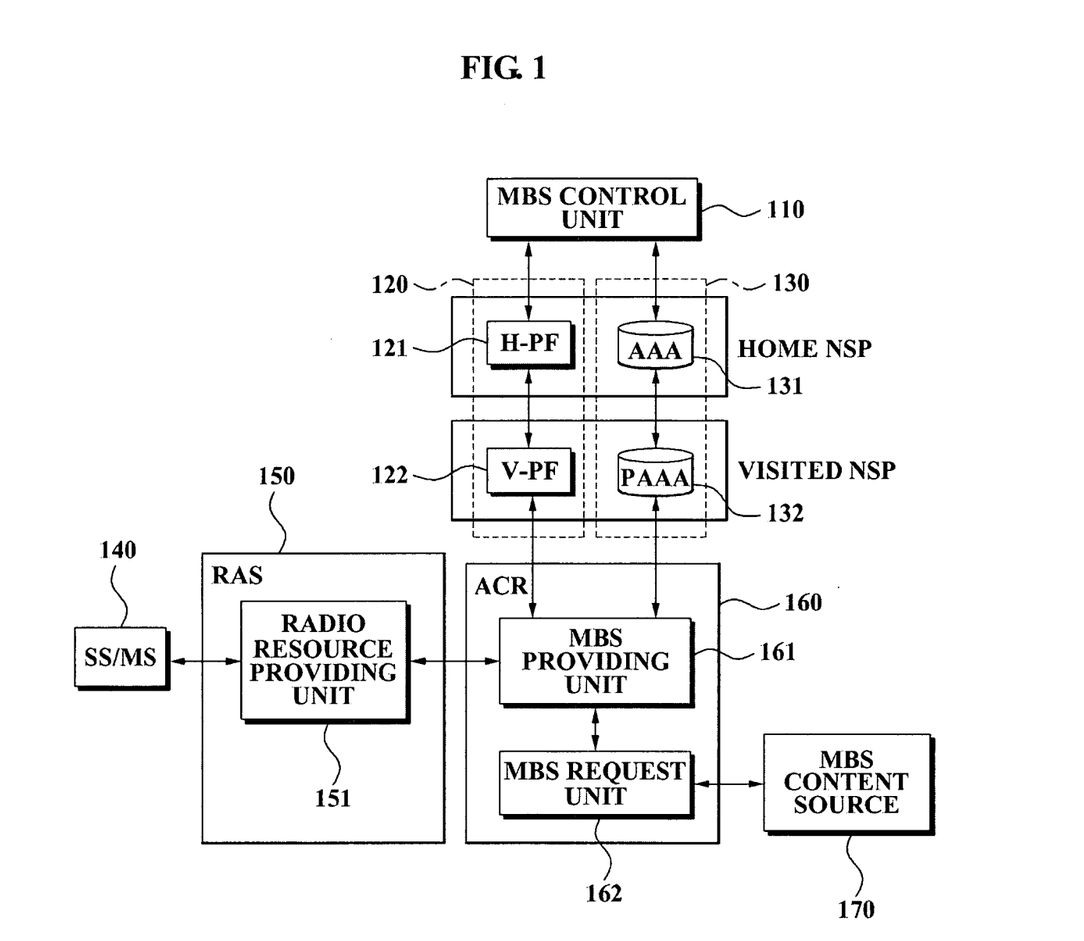
FIG. 1 is a block diagram illustrating a configuration of a system for providing a multicast/broadcast service (MBS) using a Wireless Broadband Internet/Worldwide Interoperability for Microwave Access (WiBro/WiMAX) network according to an exemplary embodiment of the present invention.

FIG. 1 is a block diagram illustrating a configuration of a system for providing a multicast/broadcast service (MBS) using a Wireless Broadband Internet/Worldwide Interoperability for Microwave Access (WiBro/WiMAX) network according to an exemplary embodiment of the present invention.

Referring to FIG. 1, a system for providing MBS using a WiBro/WiMAX network according to an exemplary embodiment of the present invention comprises an MBS control unit 110, a quality of service (QoS) control unit 120, a user authentication server 130, an MBS user terminal (SS/MS) 140, a radio access station (RAS) 150, an access control router (ACR) 160, and an MBS content source 170.

The MBS control unit 110 generates a beginning and an end of an MBS bearer session, and requests the QoS control unit 120 for an allocation and release of a QoS. Also, the MBS control unit 110 controls the MBS content source 170, and transmits MBS bearer traffic with respect to the MBS bearer session to the ACR 160.

The MBS control unit 110 also updates an MBS user profile when an MBS user is newly registered, and provides the updated MBS user profile with the user authentication server 130.

The MBS control unit 110 can still further perform an MBS service join with respect to the MBS user terminal SS/MS 140.

The QoS control unit 120 requests the allocation and release of the QoS with respect to the beginning and the end of the MBS bearer session which is received from the MBS control unit 110. In doing so, the QoS control unit 120 can comprise a Home policy function (H-PF) 121 and a Visited policy function (V-PF) 122.

The H-PF 121 refers to a policy function which exists in a home network. The V-PF 122 refers to a policy function which exists in a visited network. The policy function (PF) performs a policy decision point (PDP) function to control the QoS.

The user authentication server 130 stores the MBS user profile which is provided from the MBS control unit 110, and transmits the MBS user profile to the ACR 160. Also, the user authentication server 130 performs an authorization, authentication, and accounting of the MBS user.

In doing so, the user authentication server 130 can comprise an authentication, authorization and accounting (AAA) server 131 which exists in the home network, and a proxy authentication, authorization and accounting (PAAA) server 132 which exists in the visited network.

The user authentication server 130 can also receive and store the MBS user profile, which is updated by the MBS control unit 110, when the MBS user is newly registered, and transmit the updated MBS user profile to the ACR 160.

The user authentication server 130 can still further receive information about a user that requests the MBS bearer traffic, from the ACR 160, and perform an authentication of the user based on the MBS user profile.

In this case, the information about the user can comprise MBS user information and information about the requested MBS bearer traffic.

The ACR 160 allocates a multicast service flow identifier (SFID) with respect to the MBS bearer session in order to provide the SS/MS 140 with the MBS bearer traffic which is received from the MBS content source 170, when the allocation of the QoS is requested. The ACR 160 also releases the allocated multicast SFID, when the release of the QoS is requested.

In this case, the multicast SFID can comprise a unique value to classify the MBS bearer session in an identical MBS zone.

The ACR 160 can also perform the authentication of the user, based on the MBS user profile which is received from the user authentication server 130, when the MBS bearer traffic is requested from the SS/MS 140. The ACR 160 can still further provide the RAS 150 with the allocated multicast SFID with respect to the MBS bearer session, when the user is authenticated. In this case, the MBS bearer session corresponds to the MBS bearer traffic which is requested by the user.

The authentication of the user can be performed in the ACR 160 or in the user authentication server 130.

The ACR 160 can comprise an MBS providing unit 161 and an MBS request unit 162.

The MBS providing unit 161 performs the authentication of the user that requests the MBS bearer traffic, based on the MBS user profile which is received from the user authentication server 130. The MBS providing unit 161 can also provide the RAS 150 with the allocated multicast SFID with respect to the MBS bearer traffic, when the user is authenticated.

To do so, the MBS providing unit 161 can comprise a storing unit (not shown) for storing the MBS user profile which is received from the user authentication server 130.

The MBS request unit 162 provides the MBS providing unit 161 with the information about the user with respect to a request for the MBS bearer traffic. The MBS request unit 162 can also transmit the MBS bearer traffic to the MBS user terminal of the user, when the user is authenticated.

The authentication of the user that requests the MBS bearer traffic is performed based on the MBS user profile and the information about the user which is provided from the MBS providing unit 161. The authentication of the user can be performed in the MBS providing unit 161 or the user authentication server 130.

A function which receives the request for the MBS bearer traffic, e.g. an Internet group management protocol (IGMP) snooping/proxy function, can request the MBS providing unit 161 for the QoS, instead of an application function.

The RAS 150 allocates a multicast connection identifier (CID) corresponding to the multicast SFID, which is allocated in the ACR 160, according to whether the MBS user requests the MBS bearer traffic. The RAS 150 can also control a radio resource with the MBS user terminal.

To do so, the RAS 150 can comprise a radio resource providing unit 151.

The radio resource providing unit 151 allocates the multicast CID corresponding to the allocated multicast SFID in order to provide the MBS user terminal of the user with MBS bearer traffic which is requested by the user. The radio resource providing unit 151 can also control the radio resource with the MBS user terminal of the user, and provide the MBS user terminal with the MBS bearer traffic which is requested by the user.

Although the MBS request unit 162 is included in the ACR 160 as illustrated in FIG. 1, in yet other embodiments of the present invention the MBS request unit 162 can be included in the RAS 150.

Specifically, the ACR 160 can comprise the MBS providing unit 161, and the RAS 150 can comprise both the radio resource providing unit 151 and the MBS request unit 162. Accordingly, when the MBS bearer traffic is requested from the MBS user terminal, the MBS request unit 162 in the RAS 150 receives a message requesting the MBS bearer traffic, e.g. an IGMP/multicast listener discovery (MLD) join message, and reports to the ACR 160 that the MBS bearer traffic is requested. The MBS providing unit 161 in the ACR 160 receives the information about the user from the RAS 150. The MBS providing unit 161 can also perform the authentication of the user by transmitting the received information about the user to the user authentication server 130, or perform the authentication of the user via the ACR 160. In this case, the authentication of the user can be performed based on the MBS user profile.

Operations according to an exemplary embodiment of the present invention can be described in greater detail by referring to FIGS. 2 through 8. Hereinafter, the exemplary operations performed when an MBS is an Internet protocol television (IPTV) service are described.

Figure 2:
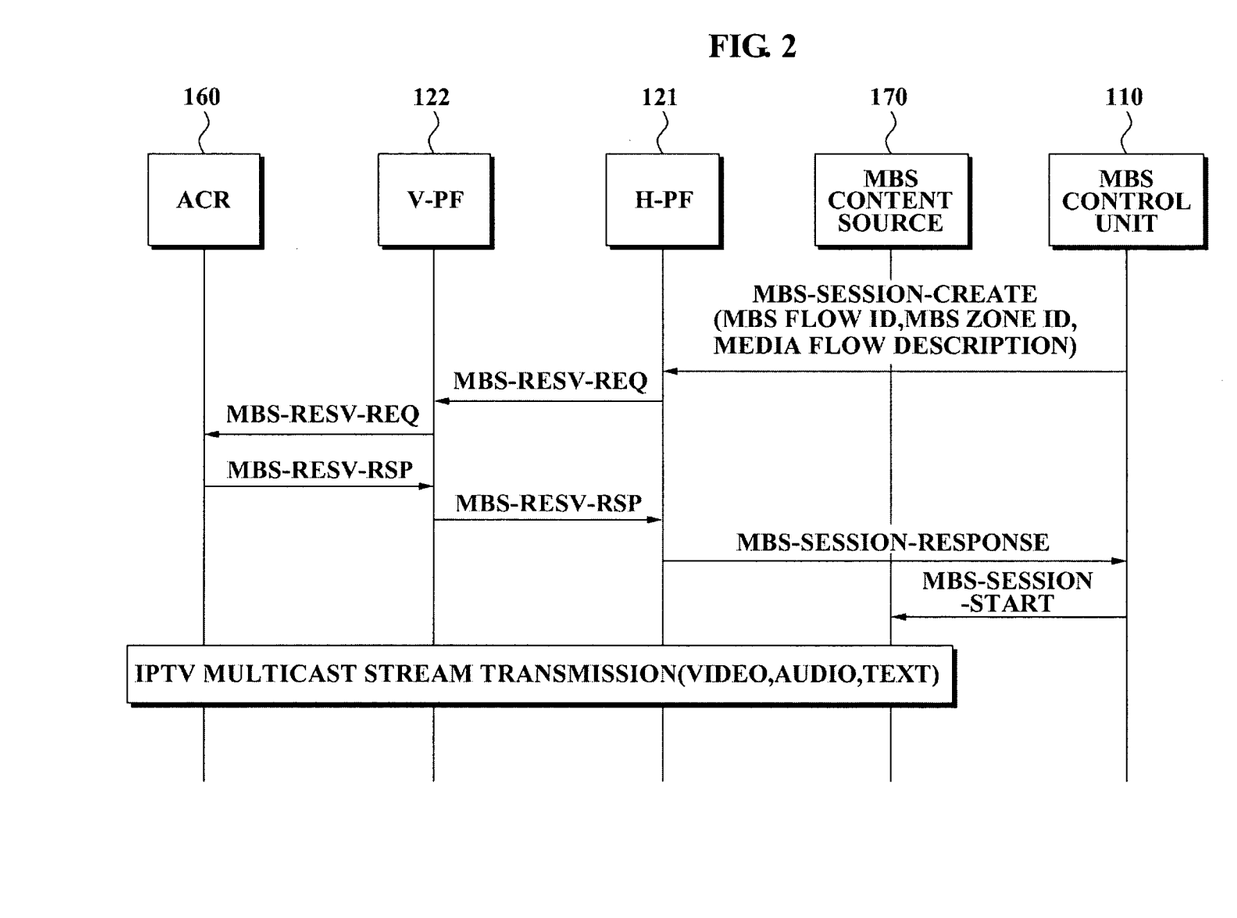
FIG. 2 is a signal exchange diagram illustrating an operation of allocating a QoS with respect to an MBS bearer session in a method of providing an MBS according to an exemplary embodiment of the present invention.

FIG. 2 is a signal exchange diagram illustrating an operation of allocating a QoS with respect to an MBS bearer session in a method of providing an MBS according to an exemplary embodiment of the present invention. FIG. 2 illustrates an MBS bearer session setup operation.

Referring to FIG. 2, in an exemplary operation of allocating the QoS, an MBS-session-create message is transmitted to the H-PF 121 at a first step, before the MBS control unit 110 transmits an IPTV bearer traffic to a WiBro/WiMAX network.

The MBS-session-create message includes an MBS flow identification (ID), an MBS zone ID, and a media flow description, as parameters.

The MBS flow ID is used to classify an IPTV bearer session in the MBS control unit 110, the MBS content source 170, the H-PF 121, the V-PF 122, and the ACR 160. The media flow description includes information about the IPTV bearer session.

The media flow description includes a multicast IP address, a unicast source IP address with respect to IPTV traffic, a user datagram protocol (UDP) port, an MBS type, a media type, a codec, and a QoS requirement. The MBS type can be a multicast service or a broadcast service. The media type can be at least any one of a video, audio, and text. The QoS requirement can be a bandwidth, a QoS class, and the like.

The MBS zone ID is a parameter to be used for indicating in which location of the WiBro/WiMAX network an MBS flow is available. The MBS flow corresponds to an IPTV channel. When a handover occurs, such as where a mobile terminal moves to an area included in an MBS zone, the MBS zone ID is not required to connect to an MBS again in order to receive an IPTV. However, when the MBS zone ID moves to another area, the MBS zone ID is required to be set again to connect to the MBS. Accordingly, the multicast IP address and the unicast source IP address, which classify the IPTV channel, have a unique value in a same MBS zone.

The H-PF 121 receives the MBS-session-create message, extracts a QoS policy in the media flow description, and transmits an MBS-RESV-REQ message to the V-PF 122 at a second step. In this case, the MBS-RESV-REQ message requests the ACR for an allocation of the QoS.

The MBS-RESV-REQ message includes the MBS flow ID, the MBS zone ID, the MBS type, a 5-tuple, a required bandwidth, and a QoS priority parameters. Each of the parameters described above are not described in further detail in this specification since each are well-known to those skilled in the art.

The V-PF 122 maps the QoS policy included in the MBS-RESV-REQ message to a local QoS policy of a visited network, and transmits the MBS-RESV-REQ message to the ACR 160 at a third step.

The ACR 160 allocates a multicast SFID with respect to the IPTV bearer session which is classified into the multicast IP address and the unicast source IP address, and transmits an MBS-RESV-RSP message to the V-PF 122 at a fourth step.

The MBS-RESV-RSP message includes the MBS flow ID and a QoS reservation result parameters.

The multicast SFID, which is allocated with respect to the IPTV bearer session by the ACR 160, has the unique value. Accordingly, even when an IPTV service request message, e.g. an IGMP/MLD join message, is not received from an MBS user terminal, the ACR 160 allocates the multicast SFID with respect to the IPTV bearer session.

The V-PF 122 transmits the MBS-RESV-RSP message to the H-PF 121 at a fifth step. The H-PF 121 then transmits an MBS-session-response with respect to the MBS-session-create message to the MBS control unit 110 at a sixth step.

The MBS control unit 110 transmits an MBS-session-start message to the MBS content source 170 at a seventh step. The MBS-session-start message requests an IPTV bearer traffic transmission which is classified into the multicast IP address and the unicast source IP address.

The MBS content source 170 then transmits an IPTV multicast stream, which corresponds to the IPTV bearer traffic, to an IP network through a control of the MBS control unit 110 at an eighth step. The ACR 160 receives the IPTV bearer traffic transmitted to the IP network. In this instance, the ACR 160 uses an IP multicast routing protocol to receive the IPTV bearer traffic.

The ACR illustrated in FIG. 2 can be the MBS providing unit 161 included in the ACR 160 of FIG. 1, but is not limited thereto.

Figure 3:
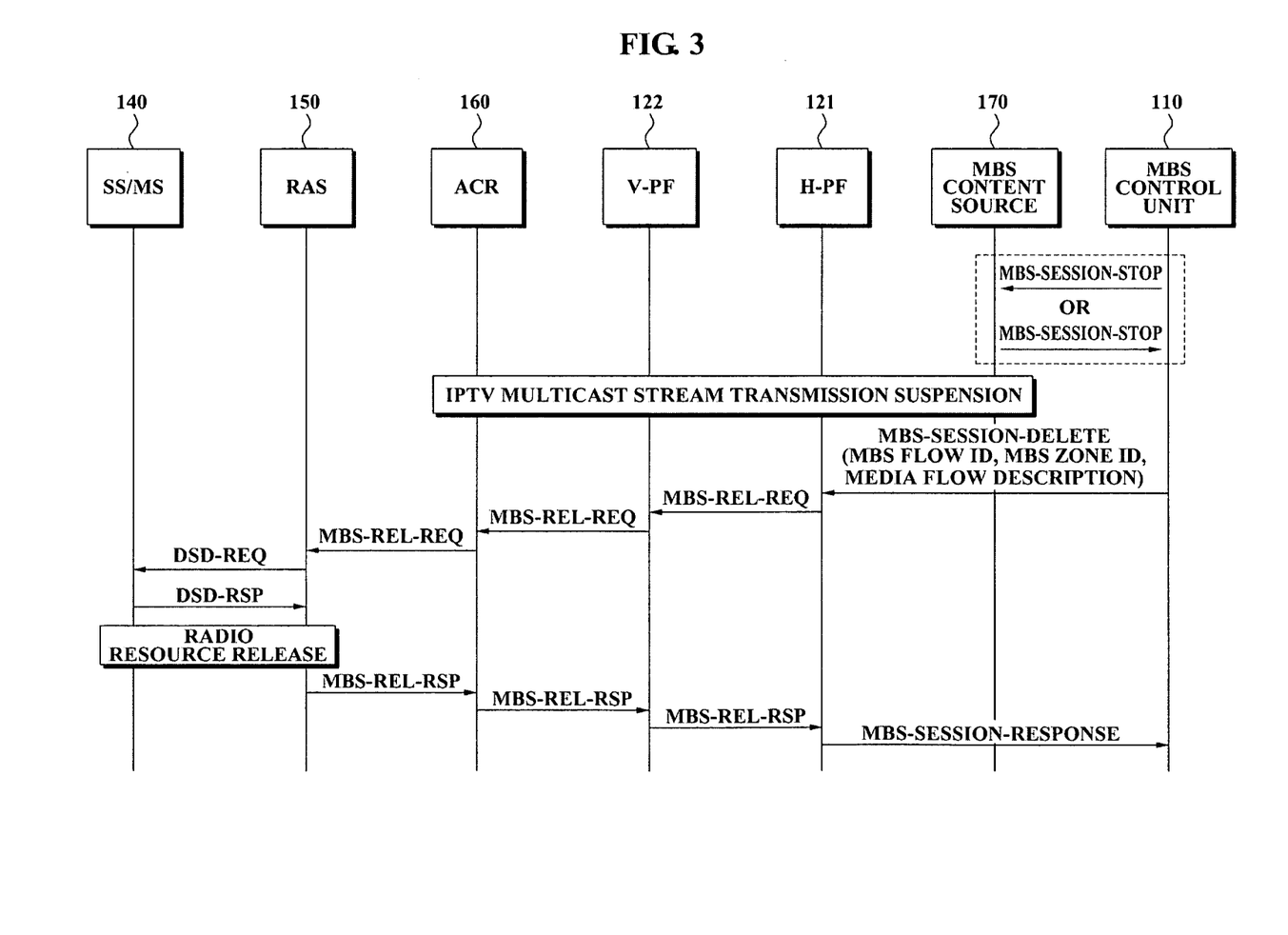
FIG. 3 is a signal exchange diagram illustrating an operation of releasing a QoS with respect to an MBS bearer session in a method of providing an MBS according to an exemplary embodiment of the present invention.

FIG. 3 is a signal exchange diagram illustrating an operation of releasing a QoS with respect to an MBS bearer session in a method of providing an MBS according to an exemplary embodiment of the present invention.

Referring to FIG. 3, in an operation of releasing the QoS with respect to the MBS bearer session, when suspending an IPTV bearer traffic transmission to a WiBro/WiMAX network, the MBS control unit 110 transmits an MBS-session-stop message to the MBS content source 170 in a first step. The MBS-session-stop message includes an MBS flow ID, and can be transmitted from the MBS content source 170 to the MBS control unit 110.

The MBS content source 170 then suspends an IPTV multicast stream transmission at a second step.

When the IPTV multicast stream transmission is suspended, the MBS control unit 110 transmits an MBS-session-delete message to the H-PF 121 at a third step. The MBS-session-delete message requests a release of an IPTV bearer session, and includes the MBS flow ID, an MBS zone ID, and a media flow description, as parameters.

The H-PF 121 transmits an MBS-REL-REQ message to the V-PF 122 at a fourth step. The MBS-REL-REQ message requests a release of a QoS with respect to the IPTV bearer session which is classified into the MBS zone ID, a multicast IP address, and a unicast source IP address. The V-PF 122 transmits the MBS-REL-REQ message received from the H-PF 121, to the ACR 160 at a fifth step.

When the SS/MS 140, which is registered in the IPTV bearer session which requests the release of the QoS, exists, the ACR 160 transmits the MBS-REL-REQ message which requests the release of the QoS with respect to the SS/MS, to the RAS 150 at a sixth step.

The RAS 150 receives the MBS-REL-REQ message, and transmits a DSD-REQ message to release the QoS, to the SS/MS 140 at a seventh step.

When receiving a DSD-RSP message in response to the DSD-REQ message from the SS/MS 140 at an eighth step, the RAS 150 retrieves a multicast CID corresponding to the IPTV bearer session, releases a radio resource which is connected to the SS/MS at a ninth step, and transmits an MBS-REL-RSP message to the ACR 160 at a tenth step. The MBS-REL-RSP message is in response to the release of the QoS and includes an SS/MS ID, the MBS zone ID, and a multicast SFID.

The ACR 160 retrieves the multicast SFID with respect to the IPTV bearer session, and transmits an MBS-REL-RSP message to the V-PF 122 at an eleventh step. The MBS-REL-RSP message includes the MBS flow ID and a QoS release result.

The V-PF 122 transmits the MBS-REL-RSP message received from the ACR 160, to the H-PF 121 at a twelfth step. The H-PF 121 then transmits an MBS-session-response message including the MBS flow ID and the QoS release result to the MBS control unit 110 at a thirteenth step, and releases the QoS with respect to the IPTV bearer session.

The ACR illustrated in FIG. 3 can be the MBS providing unit 161 included in the ACR 160 of FIG. 1, but is not limited thereto. The RAS illustrated in FIG. 3 can be a radio resource providing unit 151 included in the RAS 150 of FIG. 1, but is not limited thereto.

Figure 4:
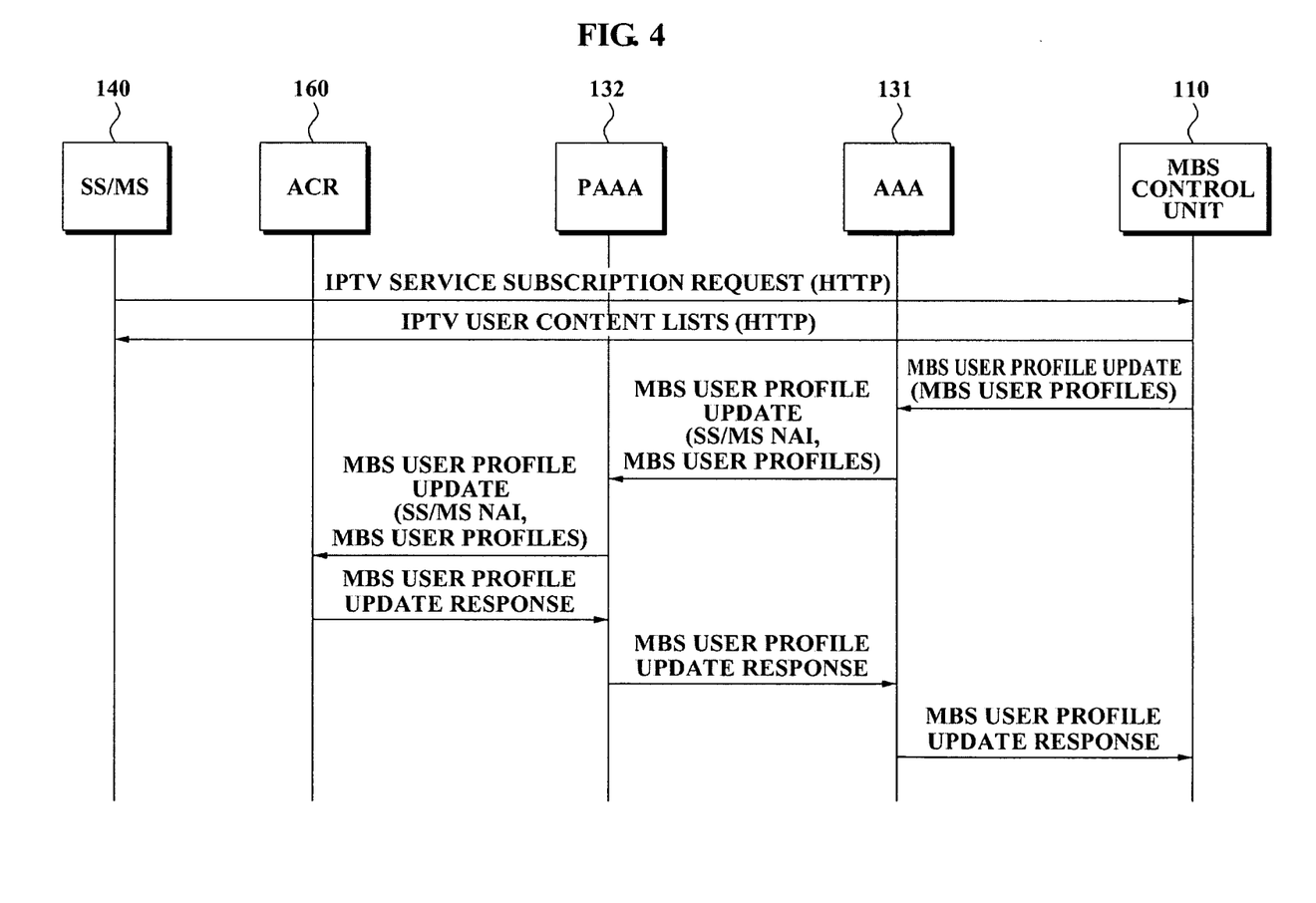
FIG. 4 is a signal exchange diagram illustrating an operation according to an MBS service join of an MBS user in a method of providing an MBS according to an exemplary embodiment of the present invention.

FIG. 4 is a signal exchange diagram illustrating an operation according to an MBS service join of an MBS user in a method of providing an MBS according to an exemplary embodiment of the present invention.

Referring to FIG. 4, when an MBS user joins an IPTV service or changes an IPTV service which has been previously joined, the SS/MS 140 transmits an IPTV service subscription request message to the MBS control unit 110 by using a hypertext transport protocol (HTTP) at a first step.

One example of a change of the IPTV service can comprise a case wherein a user that uses a service receiving a basic channel, changes the service to another service receiving a premium channel.

The MBS control unit 110 performs the AAA function with respect to the SS/MS 140, and transmits an IPTV user content lists message to the SS/MS 140 by using the HTTP at a second step.

The IPTV user content lists message includes information about an IPTV bearer session, a digital rights management (DRM) key for a content security of an application layer, and the like.

The MBS control unit 110 transmits an MBS user profile update message including MBS user profiles, i.e. an updated MBS user profile message, to the AAA server 131 at a third step. In this case, the updated MBS user profile message includes an IPTV bearer session list including a multicast IP address and a unicast source IP address. The IPTV bearer session list can be received in the SS/MS 140.

The AAA server 131 adds a network access identifier (NAI) to the updated MBS user profile message, and transmits the NAI to the PAAA server 132 at a fourth step. The NAI is used for distinguishing a newly registered SS/MS and a SS/MS where the IPTV service is changed. The PAAA server 132 transmits the updated MBS user profile message to the ACR 160 to which the SS/MS 140 is connected at a fifth step.

The ACR 160 receives the updated MBS user profile message, and stores an MBS user profile with respect to the SS/MS 140 in a local database. The ACR 160 also transmits an MBS user profile update response message in response to the MBS user profile update message to the PAAA server 132 at a sixth step. The MBS user profile update response message includes a SS/MS NAI and an update result.

The PAAA server 132 transmits the MBS user profile update response message to the AAA server 131 at a seventh step. The AAA server 131 then transmits the MBS user profile update response message including the update result to the MBS control unit 110 at an eighth step. Accordingly, the operation of the MBS service join of the MBS user is completed.

Figure 5:
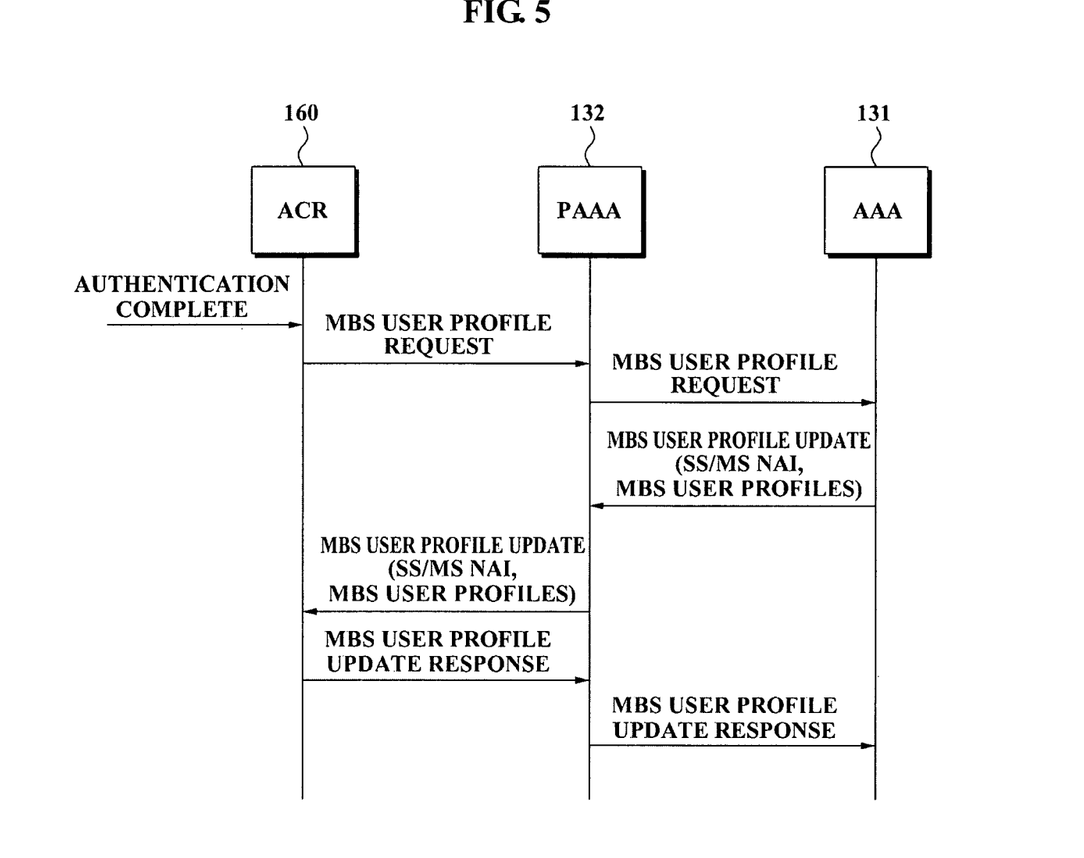
FIG. 5 is a signal exchange diagram illustrating an operation when an MBS user terminal is initiated in a method of providing an MBS according to an exemplary embodiment of the present invention.

FIG. 5 is a signal exchange diagram illustrating an operation when an MBS user terminal is initiated in a method of providing an MBS according to an exemplary embodiment of the present invention.

Referring to FIG. 5, when an SS/MS is initiated, the ACR 160 recognizes that the SS/MS connects with a WiBro/WiMAX network and an authentication is completed at a first step. The ACR 160 then transmits an MBS user profile request message including an SS/MS NAI to the PAAA server 132 at a second step. The MBS user profile request message requests an MBS user profile with respect to the SS/MS.

The PAAA server 132 transmits the MBS user profile request message to the AAA server 131 at a third step. The AAA server 131 receives the MBS user profile request message, and transmits an MBS user profile update message, i.e. an updated MBS user profile, to the PAAA server 132 at a fourth step. The MBS user profile update message includes the SS/MS NAI and MBS user profiles.

The PAAA server 132 receives the updated MBS user profile, and transmits the updated MBS user profile to the ACR 160 to which the SS/MS is connected at a fifth step.

In this case, the ACR 160 stores the MBS user profile with respect to the SS/MS in a local database, and transmits an MBS user profile update response message, to inform that the requested MBS user profile is received, to the PAAA server 132 at a sixth step. The PAAA server 132 transmits the MBS user profile update response message, to inform that the MBS user profile is received, to the AAA server 131 at a seventh step.

Figure 6:
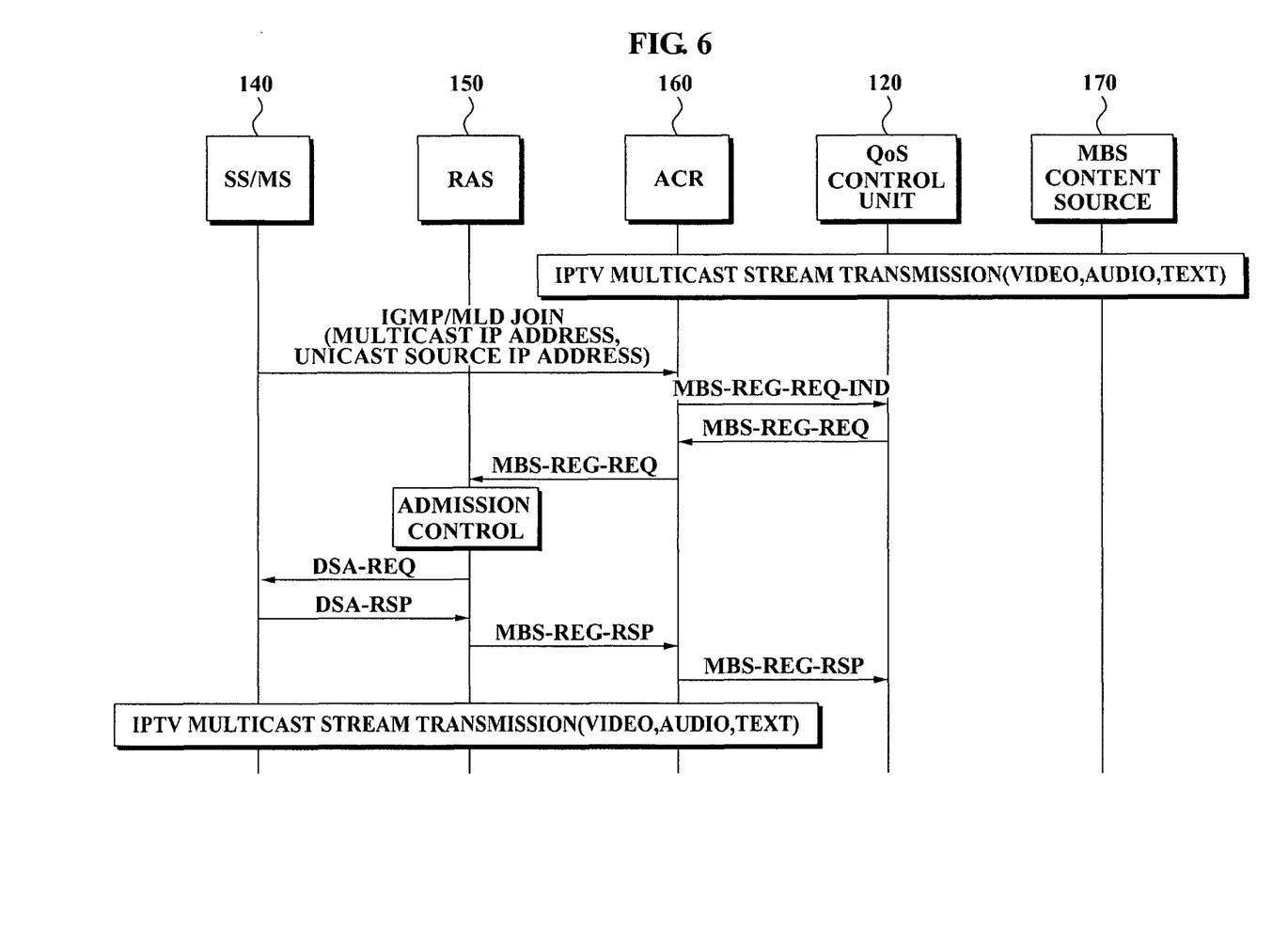
FIG. 6 is a signal exchange diagram illustrating an operation of allocating a QoS when requesting an MBS in an MBS user terminal in a method of providing an MBS according to an exemplary embodiment of the present invention.

FIG. 6 is a signal exchange diagram illustrating an operation of allocating a QoS when requesting an MBS in an MBS user terminal in a method of providing an MBS according to an exemplary embodiment of the present invention.

In FIG. 6, it can be assumed for illustration purposes that the SS/MS 140 is joined in the MBS through the exemplary operation illustrated in FIG. 4.

Referring to FIG. 6, the ACR 160 receives an IPTV multicast stream from the MBS content source 170 through the operation illustrated in FIG. 2 at a first step.

When a user of the SS/MS 140 selects an IPTV service, the SS/MS transmits a message requesting a selected IPTV bearer traffic, e.g. an IGMP/MLD join message, to a WiBro/WiMAX network at a second step. A multicast IP address and a unicast source IP address included in the IGMP/MLD join message are used as an IPTV channel identifier which is selected by the user in the WiBro/WiMAX network.

The ACR 160 transmits an MBS-REG-REQ-IND message, to inform that IPTV bearer traffic is requested, to the QoS control unit 120, and more specifically for example, to the policy function (PF) corresponding to the QoS control unit 120 at a third step. The MBS-REG-REQ-IND message includes an SS/MS NAI, an MBS zone ID, and an MBS flow ID. The PF corresponding to the QoS control unit 120 transmits an MBS-REG-REQ message including the SS/MS NAI and the MBS flow ID to the ACR 160 at a fourth step. The MBS-REG-REQ message requests a registration of the SS/MS 140 with respect to an IPTV bearer session. When a fast channel change of the IPTV service is requested, the operation between the ACR and the PF described above can be omitted.

The ACR 160 selects a previously allocated multicast SFID from a multicast IP address and a unicast source IP address, and transmits an MBS-REG-REQ message to the RAS 150 at a fifth step. The multicast IP address and a unicast source IP address are included in the IGMP/MLD join message. The MBS-REG-REQ message includes an SS/MS ID, a multicast SFID, a 5-tuple, a bandwidth, and a QoS priority, and requests a registration of a terminal with respect to the IPTV bearer session.

The RAS 150 performs an admission control with respect to a radio resource with the SS/MS 140 which requests the IPTV bearer traffic at a sixth step. In this case, the admission control with respect to the radio resource is performed when the SS/MS 140 first requests the IPTV bearer traffic. Specifically, when the SS/MS 140 is not a terminal which first requests the IPTV bearer traffic, the admission control has already been performed. Accordingly, the admission control is not required to be performed.

When an allocation of the radio resource may be available through the admission control, the RAS 150 allocates a multicast CID, and transmits a DSA-REQ message to the SS/MS 140 at a seventh step to inform that the radio resource is allocated. The RAS 150 also receives a DSA-RSP message in response to the DSA-REQ message from the SS/MS 140 at an eighth step.

The RAS 150 transmits an MBS-REG-RSP message to the ACR 160 at a ninth step. The MBS-REG-RSP message includes the SS/MS ID, the multicast SFID, and an MBS registration result, and indicates that the SS/MS 140 is registered in the IPTV bearer session. The ACR 160 transmits an MBS-REG-RSP message to the PF corresponding to the QoS control unit 120 at a tenth step. In this case, the operation of transmitting the MBS-REG-RSP message, which includes the SS/MS NAI, the MBS flow ID, and the MBS registration result, from the ACR to the PF, can be omitted when the fast channel change of the IPTV service is requested.

The ACR 160 then transmits the IPTV bearer traffic to the RAS 150 and provides the SS/MS 140 with the IPTV bearer traffic which is requested by the SS/MS at an eleventh step.

When another SS/MS requests an identical IPTV bearer traffic while the IPTV bearer traffic is provided to the SS/MS 140, the operation described above is repeated. In this instance, the admission control in the RAS can be omitted.

Figure 7:
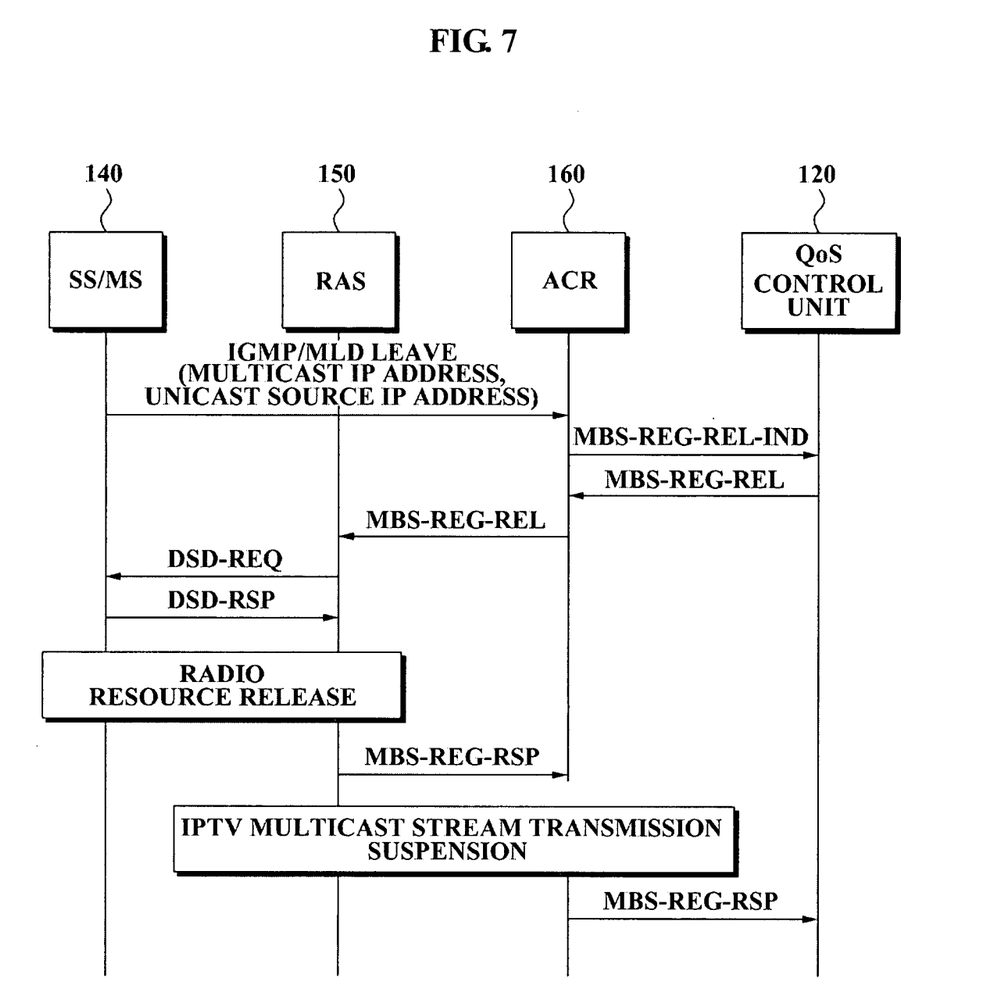
FIG. 7 is a signal exchange diagram illustrating an operation of releasing a QoS when suspending an MBS requested in an MBS user terminal in a method of providing an MBS according to an exemplary embodiment of the present invention.

FIG. 7 is a signal exchange diagram illustrating an operation of releasing a QoS when suspending an MBS requested in an MBS user terminal in a method of providing an MBS according to an exemplary embodiment of the present invention.

Referring to FIG. 7, when a suspension of an IPTV service of which a user of the MBS user terminal SS/MS is viewing is selected, the SS/MS 140 transmits a message which indicates a service suspension, e.g. an IGMP/MLD leave message, to a WiBro/WiMAX network at a first step. The IGMP/MLD leave message includes a multicast IP address and a unicast source IP address, and the multicast IP address and the unicast source IP address are used as a channel identifier of IPTV where the service suspension is requested by the user in the WiBro/WiMAX network.

The ACR 160 transmits an MBS-REG-REL-IND message, to inform that the user requests the service suspension, to the PF corresponding to the QoS control unit 120 at a second step. The MBS-REG-REL-IND message includes an SS/MS NAI and an MBS flow ID. The PF corresponding to the QoS control unit 120 transmits an MBS-REG-REL message to the ACR 160 at a third step. The MBS-REG-REL message requests a registration release of the SS/MS 140 with respect to an IPTV bearer session, and includes the SS/MS NAI and the MBS flow ID. When a fast channel change of the IPTV service is requested, the operation between the ACR and the PF described above can be omitted.

The ACR 160 selects an allocated multicast SFID from the multicast IP address and the unicast source IP address included in the IGMP/MLD leave message, and then transmits an MBS-REG-REL message to the RAS 150 at a fourth step. The MBS-REG-REL message requests the registration release of the MBS user terminal SS/MS 140 with respect to an IPTV bearer session, and includes an SS/MS ID, a multicast SFID, a 5-tuple, a bandwidth, and a QoS priority.

The RAS 150 selects a multicast CID corresponding to the multicast SFID, and transmits a DSD-REQ message to the SS/MS 140 at a fifth step to inform that the requested IPTV service is required to be suspended. The RAS 150 receives a DSD-RSP message in response to the DSD-REQ message from the SS/MS 140 at a sixth step.

In this case, when an IPTV bearer traffic which requests the service suspension is provided in only an SS/MS which requests the service suspension, the RAS 150 receives the DSD-RSP message, retrieves the multicast CID, and releases a radio resource at a seventh step. Conversely, when the IPTV bearer traffic is provided in the SS/MS 140 which requests the service suspension as well as another SS/MS, a registered SS/MS with respect to the multicast CID exists. Accordingly, the RAS 150 does not retrieve the multicast CID, and does not release the radio resource.

The RAS 150 transmits an MBS-REG-RSP message to the ACR 160 at an eighth step. The MBS-REG-RSP message indicates that a registration of the SS/MS with respect to the IPTV bearer session is released. The MBS-REG-RSP message also includes an SS/MS ID, a multicast SFID, and an MBS registration result.

When the SS/MS 140 with respect to the multicast SFID is lastly registered in the RAS 150, the ACR 160 suspends an IPTV multicast stream transmission at a ninth step, and transmits an MBS-REG-RSP message to the PF corresponding to the QoS control unit 120 at a tenth step. The MBS-REG-RSP message includes the SS/MS NAI, the MBS flow ID, and the MBS registration result. When a fast channel change of the IPTV service is requested, the operation of transmitting the MBS-REG-RSP message from the ACR to the PF described above can be omitted.

Figure 8:
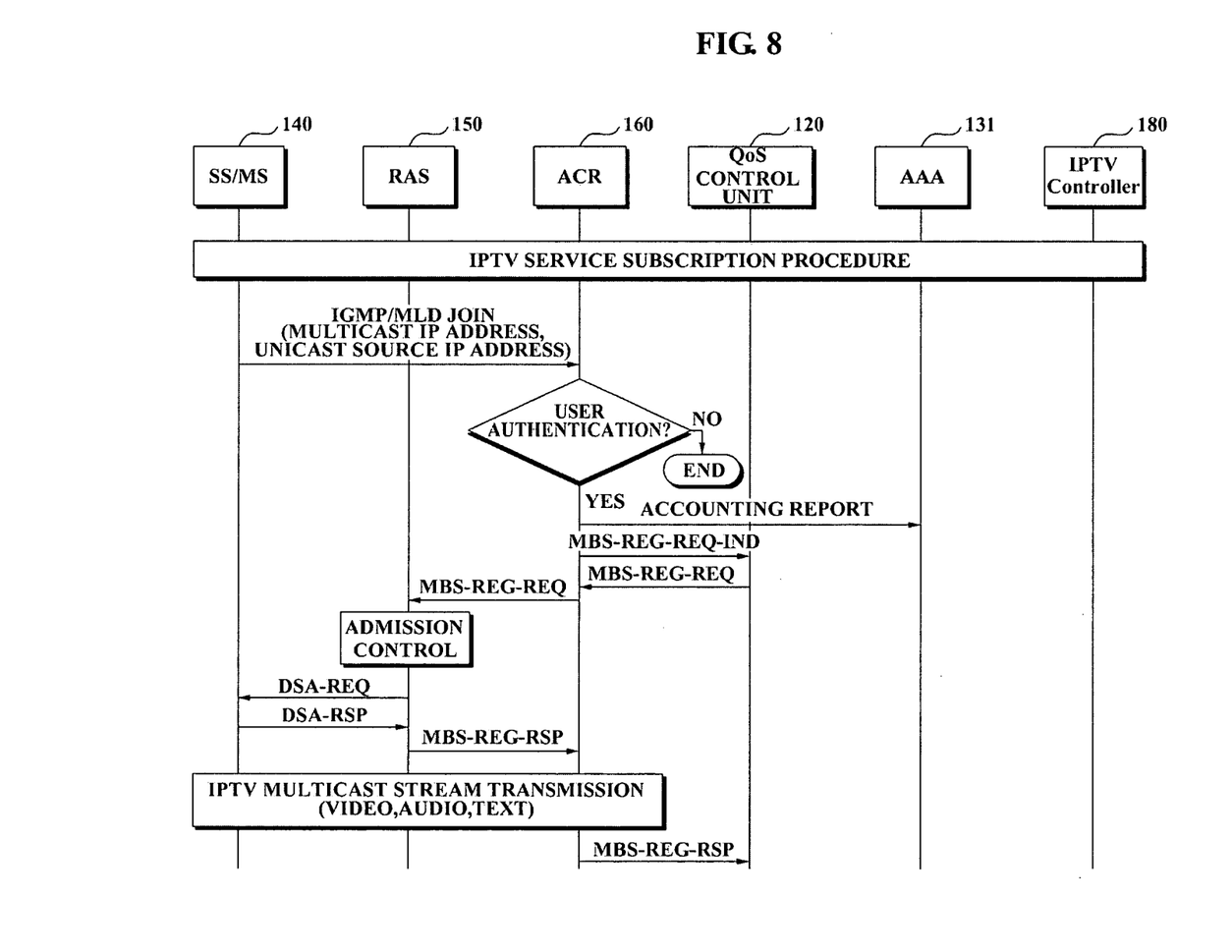
FIG. 8 is a signal exchange diagram illustrating an operation of a fast channel authorization in a method of providing an MBS according to an exemplary embodiment of the present invention.

FIG. 8 is a signal exchange diagram illustrating an operation of a fast channel authorization in a method of providing an MBS according to an exemplary embodiment of the present invention. The operation of FIG. 8 is substantially that same as shown in FIG. 6, with the addition of the operation of the fast channel authorization and now including an IPTV Controller 180.

Referring to FIG. 8, when the ACR 160 receives an IGMP/MLD join message, which requests IPTV bearer traffic, from the MBS user terminal SS/MS 140 at a first step, an IPTV channel authorization of a user that requests the IPTV bearer traffic is performed at a second step.

Specifically, the ACR 160 compares a multicast IP address and a unicast source IP address with an MBS user profile. The multicast IP address and a unicast source IP address are included in the IGMP/MLD join message, and the MBS user profile is stored in a local database. The ACR 160 determines whether the IPTV bearer traffic, i.e. an IPTV service, which is requested by a user of the SS/MS 140, can be provided. As a result of the determination, when the requested IPTV bearer traffic is not an admitted IPTV service, the ACR 160 discards the IGMP/MLD join message.

Conversely, as a result of the determination, when the requested IPTV bearer traffic is an IPTV service which can be serviceable, the ACR 160 transmits an accounting report to the AAA server 131 at a third step. Also, the ACR 160 transmits a message to inform that the IPTV bearer traffic is requested to a QoS control unit 120, for example, a PF corresponding to the QoS control unit 120, and performs other subsequent operations as described above in regard to FIG. 6.

According to exemplary embodiments of the present invention, a channel authorization is performed by using an MBS user profile stored in a local database of the ACR, and thus, a fast channel authorization can be performed, and a user can be quickly provided with a channel change.

Methods of providing MBS using a WiBro/WiMAX network according to the above-described exemplary embodiments of the present invention can be recorded upon computer-readable media including program instructions to implement various operations embodied by a computer. The media can comprise, alone or in combination with the program instructions, data files, data structures, and the like. The media and program instructions can be those specially designed and constructed for the purposes of the exemplary embodiments of the present invention, or they may be of the kind well-known and available to those skilled in computer software arts. Examples of computer-readable media include but are not limited to magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as that produced by a compiler, and files containing higher level code that can be executed by the computer using an interpreter. The described hardware devices can be configured to act as one or more software modules in order to perform the operations of the above-described embodiments of the present invention.

According to an aspect of exemplary embodiments of the present invention, a method of providing an MBS using a WiBro/WiMAX network and a system using the method provide a QoS with respect to the MBS via the WiBro/WiMAX network.

Also, according to an aspect of exemplary embodiments of the present invention, a method of providing an MBS using a WiBro/WiMAX network and a system using the method perform a user authentication in an ACR and can provide a fast channel change.

While the present invention has been shown and described with reference to certain exemplary embodiments thereof, it will be understood by those skilled in the art that various changes in form and detail may be made therein without departing from the spirit and scope of the invention as defined by the appended claims and their equivalents.

What is claimed is:

1. A system for providing a multicast/broadcast service (MBS) using a Wireless Broadband Internet/World Interoperability for Microwave Access (WiBro/WiMAX) network, the system comprising: an MBS control unit for generating a beginning and an end of an MBS bearer session; a quality of service (QoS) control unit for requesting an allocation and release of a QoS with respect to the beginning and the end of the MBS bearer session which is received from the MBS control unit; an access control router (ACR) for performing an MBS channel authorization of an MBS user to determine which MBS channels the MBS user is authorized to use, in response to receiving a request for MBS bearer traffic, for allocating a multicast service flow identifier (SFID) with respect to the MBS bearer session in order to provide the MBS user with the MBS bearer traffic which is received from an MBS content source when the allocation of the QoS is requested, and for releasing the allocated multicast SFID when the release of the QoS is requested, wherein the multicast SFID comprises a unique value to classify the MBS bearer session in an identical MBS zone; and a radio access station (RAS) for allocating a multicast connection identifier (CID) corresponding to the allocated multicast SFID according to whether the MBS user requests the MBS bearer traffic, and controlling a radio resource with the MBS user, wherein, in response to the MBS user requesting a change in an MBS channel of the MBS bearer session, the ACR is configured to perform an authentication of the MBS user based on an MBS user profile of the MBS user which is received from a user authentication server.

2. The system of claim 1, wherein the user authentication server is configured to:
receive the MBS user profile which is provided from the MBS control unit, and transmit the MBS user profile to the ACR.

3. The system of claim 2, wherein the user authentication server is configured to:
receive, from the ACR, information about the MBS user that requests the MBS bearer traffic; and
perform an authentication of the MBS user based on the MBS user profile.

4. The system of claim 2, wherein the ACR is configured to:
provide the RAS with the allocated multicast SFID with respect to the MBS bearer traffic and the MBS bearer traffic, when the user is authenticated.

5. The system of claim 4, wherein the ACR comprises:
an MBS providing unit for performing the authentication of the MBS user that requests the MBS bearer traffic, based on the MBS user profile which is received from the user authentication server, and for providing the RAS with the allocated multicast SFID with respect to the MBS bearer traffic when the user is authenticated; and
an MBS request unit for receiving the request for the MBS bearer traffic, providing the MBS providing unit with information about the user, requesting the MBS providing unit for the QoS with respect to the MBS bearer session, and transmitting the MBS bearer traffic to the MBS user.

6. The system of claim 2, wherein the RAS comprises:
an MBS request unit for providing the ACR with information of the MBS user with respect to a request for the MBS bearer traffic, and transmitting the MBS bearer traffic to the MBS user when the MBS user is authenticated based on the MBS user profile; and
a radio resource providing unit for allocating the multicast CID corresponding to the allocated multicast SFID with respect to the MBS bearer traffic, and reserving the radio resource by controlling an acceptance with respect to the requested MBS bearer traffic in order to provide the QoS when transmitting the requested MBS bearer traffic to the MBS user.

7. The system of claim 6, wherein an authentication of the MBS user based on the MBS user profile is performed in the ACR.

8. The system of claim 6, wherein an authentication of the user based on the MBS user profile is performed in the user authentication server.

9. The system of claim 2, wherein the MBS control unit is configured to update the MBS user profile and provide the user authentication server with the updated MBS user profile when the MBS user is registered.

10. The system of claim 1, wherein the MBS corresponds to an Internet protocol television (IPTV) service.

11. A method of providing a multicast/broadcast service (MBS) using a Wireless Broadband Internet/World Interoperability for Microwave Access (WiBro/WiMAX) network, the method comprising: generating a beginning and an end of an MBS bearer session in an MBS control unit; requesting an allocation and release of a quality of service (QoS) with respect to the beginning and the end of the MBS bearer session which is received from the MBS control unit, in a QoS control unit; performing, by an access control router (ACR), an MBS channel authorization of an MBS user to determine which MBS channels the MBS user is authorized to use, in response to receiving a request for MBS bearer traffic; allocating a multicast service flow identifier (SFID) with respect to the MBS bearer session in order to provide an MBS user with the MBS bearer traffic which is received from an MBS content source, when the allocation of the QoS is requested, and releasing the allocated multicast SFID when the release of the QoS is requested, in an access control router (ACR), wherein the multicast SFID comprises a unique value to classify the MBS bearer session in an identical MBS zone; and allocating a multicast connection identifier (CID) corresponding to the allocated multicast SFID according to whether the MBS user requests the MBS bearer traffic, and controlling a radio resource with the MBS user, in a radio access station (RAS), wherein, in response to a user requesting a change in an MBS channel of the MBS bearer session, the ACR is configured to perform an authentication of the MBS user based on an MBS user profile of the MBS user which is received from a user authentication server.

12. The method of claim 11, further comprising:
receiving the MBS user profile which is provided from the MBS control unit, and transmitting the MBS user profile to the ACR, in the user authentication server.

13. The method of claim 12, wherein the transmitting of the received MBS user profile comprises:
receiving, from the ACR, information about the MBS user that requests the MBS bearer traffic; and
performing an authentication of the MBS user based on the MBS user profile, in the user authentication server.

14. The method of claim 12, further comprising:
providing the RAS with the allocated multicast SFID with respect to the MBS bearer traffic and the MBS bearer traffic when the MBS user is authenticated, in the ACR.

15. The method of claim 14, wherein the providing of the MBS bearer traffic comprises:
receiving a request for the MBS bearer traffic from the MBS user;
performing the authentication of the MBS user that requests the MBS bearer traffic, based on the MBS user profile which is received from the user authentication server; and
providing the RAS with the allocated multicast SFID with respect to the MBS bearer traffic, and transmitting the MBS bearer traffic to the MBS user when the MBS user is authenticated.

16. The method of claim 12, further comprising:
receiving a request for the MBS bearer traffic from the MBS user in the RAS, and providing the ACR with information about the MBS user with respect to a request for the MBS bearer traffic;
allocating the multicast CID corresponding to the allocated multicast SFID with respect to the requested MBS bearer traffic in the RAS, when the MBS user is authenticated based on the MBS user profile; and
requesting a QoS reservation for a radio resource allocation with the MBS user, and transmitting the MBS bearer traffic to the MBS user, in the RAS.

17. The method of claim 16, wherein an authentication of the MBS user based on the MBS user profile is performed in the ACR.

18. The method of claim 16, wherein an authentication of the MBS user based on the MBS user profile is performed in the user authentication server.

19. The method of claim 12, further comprising:
updating the MBS user profile and providing the user authentication server with the updated MBS user profile when the MBS user is registered in the MBS control unit.

20. The method of claim 11, wherein the MBS corresponds to an Internet protocol television (IPTV) service.

21. A non-transitory computer-readable recording medium having stored thereon instructions for implementing a method of providing a multicast/broadcast service (MBS) using a Wireless Broadband Internet/World Interoperability for Microwave Access (WiBro/WiMAX) network, the method comprising: generating a beginning and an end of an MBS bearer session in an MBS control unit; requesting an allocation and release of a quality of service (QoS) with respect to the beginning and the end of the MBS bearer session which is received from the MBS control unit, in a QoS control unit; performing, by an access control router (ACR), an MBS channel authorization of an MBS user to determine which MBS channels the MBS user is authorized to use, in response to receiving a request for MBS bearer traffic; allocating a multicast service flow identifier (SFID) with respect to the MBS bearer session in order to provide an MBS user with the MBS bearer traffic which is received from an MBS content source, when the allocation of the QoS is requested, and releasing the allocated multicast SFID when the release of the QoS is requested, in an access control router (ACR), wherein the multicast SFID comprises a unique value to classify the MBS bearer session in an identical MBS zone; and allocating a multicast connection identifier (CID) corresponding to the allocated multicast SFID according to whether the MBS user requests the MBS bearer traffic, and controlling a radio resource with the MBS user, in a radio access station (RAS), wherein, in response to a user requesting a change in an MBS channel of the MBS bearer session, the ACR is configured to perform an authentication of the MBS user based on an MBS user profile of the MBS user which is received from a user authentication server.

22. The method of claim 11, wherein the ACR performs the MBS channel authorization in response to receiving an Internet Group Management Protocol/Multicast Listener Discovery (IGMP/MLD) join message from the MBS user.

* * * * *